United States Patent
Iwamoto et al.

(10) Patent No.: US 11,867,407 B2
(45) Date of Patent: Jan. 9, 2024

(54) RANGE HOOD

(71) Applicant: Samsung Electronics Co., Ltd., Suwon-si (KR)

(72) Inventors: Kiyoshi Iwamoto, Yokohama (JP); Kazutoshi Takenoshita, Yokohama (JP); Kenichi Murata, Yokohama (JP); Yurika Kida, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 287 days.

(21) Appl. No.: 17/389,778

(22) Filed: Jul. 30, 2021

(65) Prior Publication Data
US 2022/0049853 A1    Feb. 17, 2022

(30) Foreign Application Priority Data

Aug. 13, 2020 (JP) .................................. 2020-136617
Mar. 25, 2021 (KR) ........................ 10-2021-0038772

(51) Int. Cl.
| | | |
|---|---|---|
| *B01D 46/10* | (2006.01) | |
| *F24C 15/20* | (2006.01) | |
| *B01D 46/00* | (2022.01) | |

(52) U.S. Cl.
CPC ...... *F24C 15/2035* (2013.01); *B01D 46/0031* (2013.01); *B01D 46/0049* (2013.01); *B01D 46/0056* (2013.01); *B01D 46/10* (2013.01); *B01D 2273/30* (2013.01);
(Continued)

(58) Field of Classification Search
CPC ............ F24C 15/2035; B01D 46/0031; B01D 46/0049; B01D 46/0056; B01D 46/10; B01D 2273/30; B01D 2275/202; B01D 2277/20; B01D 2279/35
See application file for complete search history.

(56) References Cited

U.S. PATENT DOCUMENTS 4,231,769 A * 11/1980 Ahlrich ............... F24C 15/2035
                                                             55/444
5,238,473 A *  8/1993 Femiani ................. B01D 46/10
                                                             55/400
(Continued)

FOREIGN PATENT DOCUMENTS

CA         2833323 C  *  1/2019 ............ B01D 45/14
CN      201463055 U  *  5/2010
(Continued)

OTHER PUBLICATIONS

International Search Report dated Nov. 8, 2021, issued in International Application No. PCT/KR2021/009954.

*Primary Examiner* — Dung H Bui
(74) *Attorney, Agent, or Firm* — Jefferson IP Law, LLP (57) ABSTRACT

A range hood for collecting oil scattered from a rotating disk filter, capable of improving the cleaning workability is provided. The range hood includes a fan configured to generate an air flow, a disk filter provided on a flow path of the air flow and having a slit, a motor configured to rotate the disk filter, a rectifying plate provided upstream of the disk filter on the flow path of the air flow, and a disk cover configured to surround an outer periphery portion of the disc filter and having an outlet portion that allows oil from the disk filter to flow out to a predetermined portion of the rectifying plate.

15 Claims, 7 Drawing Sheets

(52) U.S. Cl.
CPC .... *B01D 2275/202* (2013.01); *B01D 2277/20* (2013.01); *B01D 2279/35* (2013.01)

(56) References Cited

U.S. PATENT DOCUMENTS

| | | | | |
|---|---|---|---|---|
| 5,443,625 | A * | 8/1995 | Schaffhausen | F24F 8/97 55/472 |
| 6,162,286 | A * | 12/2000 | Hasama | B01D 46/20 96/288 |
| 2006/0005559 | A1* | 1/2006 | Lim | F24F 13/20 62/262 |
| 2006/0010896 | A1* | 1/2006 | Choi | F24F 1/027 62/262 |
| 2008/0110339 | A1* | 5/2008 | Kwok | F24C 15/2035 95/79 |
| 2009/0019822 | A1* | 1/2009 | Feisthammel | B01D 45/08 55/385.4 |
| 2009/0281239 | A1* | 11/2009 | Hoshino | C09D 133/14 528/45 |
| 2012/0255267 | A1* | 10/2012 | Ehrensberger | B01D 45/08 55/332 |
| 2015/0101588 | A1* | 4/2015 | Yoon | B01D 45/06 126/299 D |
| 2017/0184125 | A1* | 6/2017 | Matsui | F04D 29/661 |
| 2019/0277521 | A1* | 9/2019 | Lee | F24C 15/2042 |
| 2020/0300831 | A1* | 9/2020 | Palazzo | A23L 5/11 |
| 2020/0412204 | A1* | 12/2020 | Ogasawara | H02K 9/14 |
| 2021/0348025 | A1* | 11/2021 | Shiota | C09D 183/12 |
| 2022/0151436 | A1* | 5/2022 | Newquist | A47J 37/1209 |
| 2022/0410056 | A1* | 12/2022 | Kelley | B01D 46/10 |

FOREIGN PATENT DOCUMENTS

| | | | | |
|---|---|---|---|---|
| CN | 113319040 | A * | 8/2021 | |
| DE | 102014208388 | A1 * | 6/2015 | ............ F24C 15/20 |
| EP | 3336438 | A1 * | 6/2018 | ............ F24C 15/20 |
| JP | H06-042787 | A | 2/1994 | |
| JP | 2003-050033 | A | 2/2003 | |
| JP | 2012-088014 | A | 5/2012 | |
| JP | 2013-139946 | A | 7/2013 | |
| JP | 2014238229 | A * | 12/2014 | |
| JP | 2015-152269 | A | 8/2015 | |
| JP | 2015152267 | A * | 8/2015 | |
| JP | 2018028429 | A * | 2/2018 | |
| JP | 2018054205 | A * | 4/2018 | |
| JP | 6535877 | B2 | 7/2019 | |
| KR | 10-2017-0013748 | A | 2/2017 | |
| WO | WO-2008047826 | A1 * | 4/2008 | ......... F24C 15/2035 |

\* cited by examiner

RANGE HOOD

CROSS-REFERENCE TO RELATED APPLICATION(S)

This application is based on and claims priority under 35 U.S.C. § 119(a) of a Japanese patent application number 2020-136617, filed on Aug. 13, 2020, in the Japanese Intellectual Property Office, and of a Korean patent application number 10-2021-0038772, filed on Mar. 25, 2021, in the Korean Intellectual Property Office, the disclosures of each of which is incorporated by reference herein in its entirety.

BACKGROUND

1. Field

The disclosure relates to a range hood. More particularly, the disclosure relates to a range hood having improved cleaning properties.

2. Description of the Related Art

In order to collect oil contained in fumes generated during cooking, studies on range hoods, such as disclosed in Patent Document 1 (see below), have been conducted.

The range hood includes a fan configured to generate an air flow, a filter arranged upstream of the fan in the air flow path and having a hole through which the air flow passes, an electric motor configured to rotate the filter, and a grease collecting member that surrounds the outer periphery of the filter. Accordingly, grease contained in the fumes collides with the rotating filter to flow in the direction of the outer periphery of the filter so that the grease is collected by the grease collecting member provided to surround the outer periphery of the filter. In addition, the collected grease is recovered in the form of oil in an oil reservoir provided in the grease collecting member. In addition, the range hood includes a hood part, on which the filter is mounted, and a rectifying plate detachably mounted on a lower side of the hood part and configured to increase the suction power by providing a gap with respect to the hood part.

However, because the above-described range hood is configured to collect oil from the oil reservoir of the grease collecting member that surrounds the outer periphery of the filter, a cleaning operation, such as disposing of the oil collected in the oil reservoir, is required on a regular basis. In this case, there is a need to open the rectifying plate, and then access the grease collecting member located above the rectifying plate, which degrades the cleanability. In addition, because the grease collecting member is positioned to surround the outer periphery of the disk filter, when a large amount of oil is collected or oil having an increased viscosity due to deterioration is collected, the disk filter and the oil may come into contact with each other, causing the disk filter to be contaminated. In addition, due to the air flow generated by the rotation of the disk filter, air is always circulated, which allows the collected oil to be easily deteriorated (oxidized).

Therefore, with components according to the related art, such as the disk filter, the grease collecting member, and the like, there is a difficulty in collecting oil without long-term cleaning, and the components need to be frequently cleaned.

The above information is presented as background information only to assist with an understanding of the disclosure. No determination has been made, and no assertion is made, as to whether any of the above might be applicable as prior art with regard to the disclosure.

RELATED ART DOCUMENT

Patent Document

Patent Document 1: Japanese Patent Laid-Open Publication No. 2013-139946

SUMMARY

Aspects of the disclosure are to address at least the above-mentioned problems and/or disadvantages and to provide at least the advantages described below. Accordingly, an aspect of the disclosure is to provide a range hood capable of reducing the cleaning frequency and improving the cleaning workability.

Additional aspects of the disclosure will be set forth in part in the description which follows and, in part, will be apparent from the description, or may be learned by practice of the presented embodiments.

In accordance with an aspect of the disclosure, a range hood is provided. The range hood includes a flow path, a fan disposed in the flow path to generate a flow of air that flows in the flow path, a disk filter disposed upstream of the fan in the flow path to filter the air, a motor connected to the disk filter to rotate the disk filter, a rectifying plate disposed upstream of the disk filter in the flow path, and a cover configured to cover an outer periphery of the disk filter, the cover including an outlet portion for oil to flow from the disk filter to the rectifying plate.

The outlet portion may include an outlet hole formed through a bottom surface of the cover, and further include a collection case disposed on the rectifying plate and configured to collect oil flowing from the outlet hole.

The fan, the disk filter, the collection case, and the rectifying plate may be sequentially arranged in a direction from an upper side to a lower side, and the outer periphery of the disk filter may be formed to be inclined downward such that the oil flows to the bottom surface of the cover.

The outlet hole may be formed at an outer periphery of the bottom surface of the cover, and the collection case may include an opening provided to allow oil drained from the outlet hole to flow into the collection case, the opening formed below the outlet hole to correspond to the outlet hole, and a storage space formed in the collection case to extend toward a center of the rectifying plate so that the oil introduced from the opening is stored therein.

The collection case may further include an oil detecting portion configured to detect an amount of oil accommodated in the storage space.

The disk filter may be inclined along one direction such that oil filtered out of the air may flow to the cover.

The cover and the rectifying plate may be inclined along the one direction to correspond to the disk filter.

A lower surface of the rectifying plate may be subjected to oil repellency coating.

The range hood may further include a body forming the flow path, and at least one of the disk filter, the cover, or the body may be subjected to oil repellency treatment or hydrophilic treatment.

The disk filter may be devoid of a slit in a central portion of the disk filter to increase a rigidity of the disk filter, and may be formed with a slit in an outer periphery portion of the central portion to allow the air to pass through the slit.

The central portion of the disk filter may be an area within a radial distance of less than 35% from a rotation center of the disk filter.

The collection case may be separably coupled to the rectifying plate.

The disk filter and the rectifying plate may horizontally extend in a front-rear direction, and the bottom surface of the cover may be inclined downward as being directed rearward such that the oil flows into the collection case.

The outlet portion may include an outlet flow path inclined downward such that oil flows from the cover to the rectifying plate.

The fan may include a propeller fan, and the range hood may further include a fan motor configured to rotate the propeller fan and a connecting shaft that connects the fan motor to the propeller fan to transmit a driving force from the fan motor to the propeller fan.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Meanwhile, terms "upper-lower direction", "lower side", "front-rear direction", etc. used in the following description are defined based on the drawings, and the shape and position of each component are not limited by the terms. For example, referring to FIG. 1, the −X direction may be a forward direction, and the +X direction may be a rearward direction. Based on this, left, right, and upper-lower directions may be defined.

Hereinafter, an embodiment according to the disclosure will be described in detail with reference to the accompanying drawings.

Figure 1:
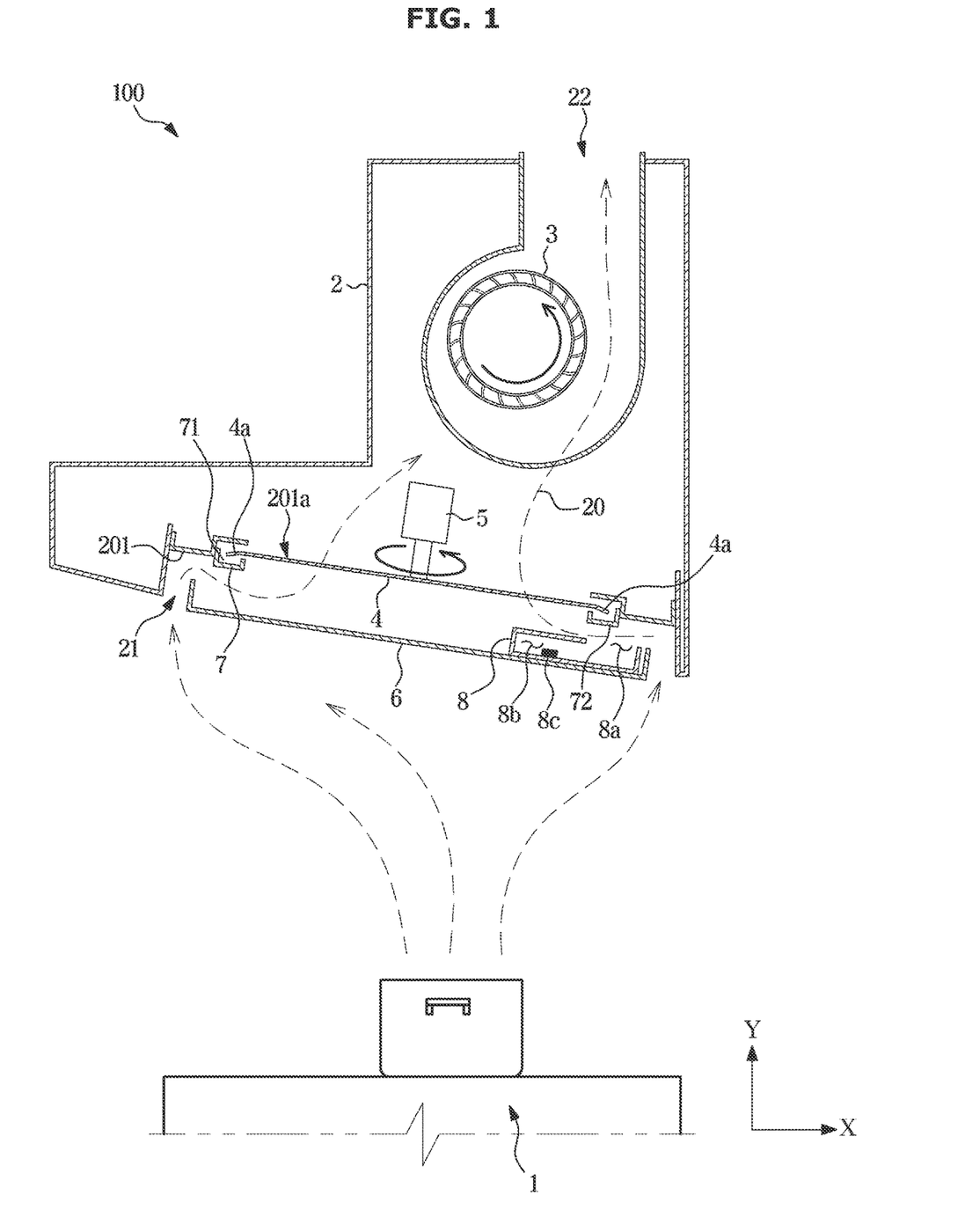
FIG. 1 is a cross-sectional view schematically illustrating a configuration of a range hood according to an embodiment of the disclosure.

FIG. 1 is a cross-sectional view schematically illustrating a configuration of a range hood according to an embodiment of the disclosure.

Figure 2:
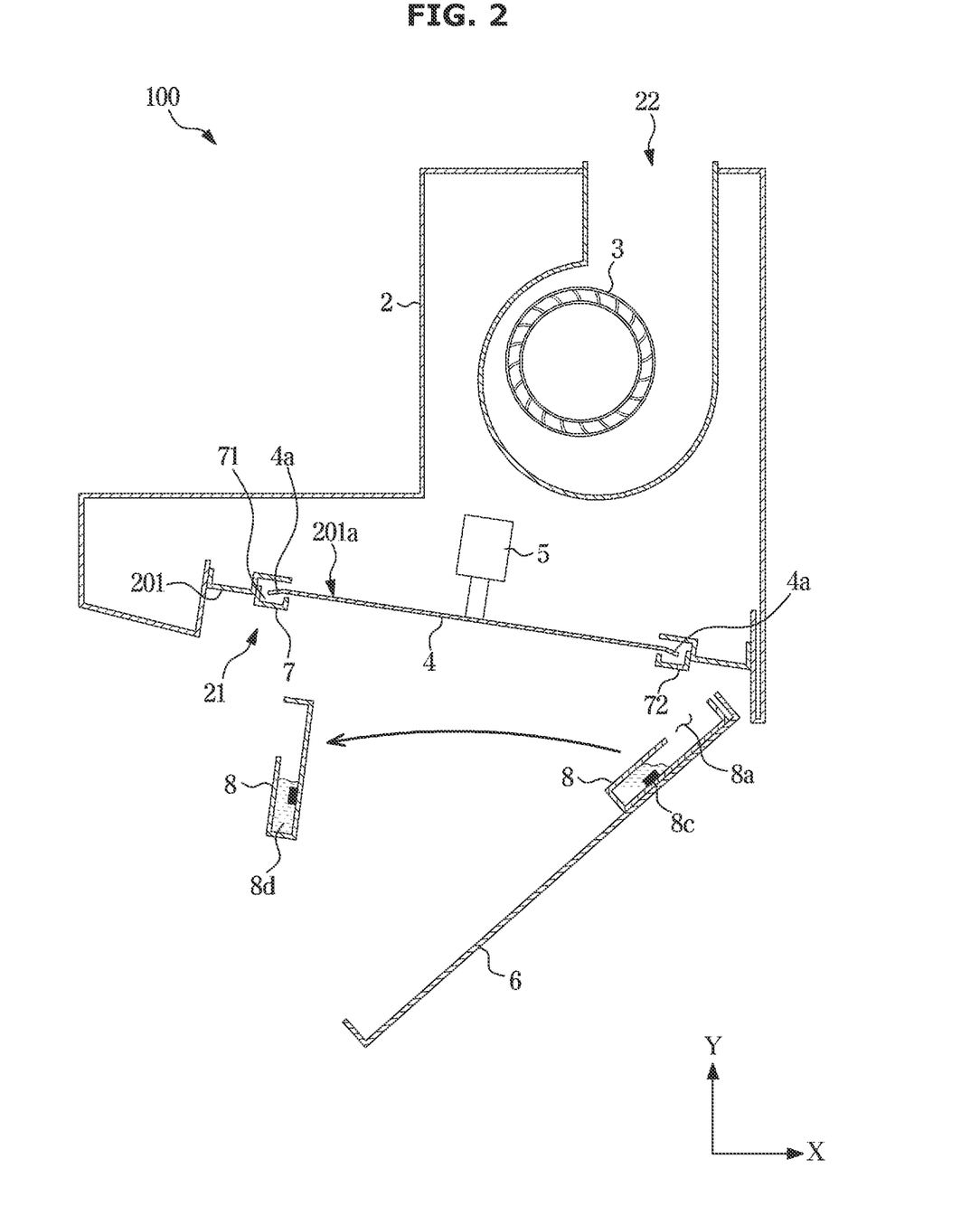
FIG. 2 is a cross-sectional view schematically illustrating a state in which a rectifying plate is opened in a range hood according to an embodiment of the disclosure.

FIG. 2 is a cross-sectional view schematically illustrating a state in which a rectifying plate is opened in a range hood according to an embodiment of the disclosure.

Referring to FIGS. 1 and 2, a range hood 100 according to the embodiment is installed in a kitchen or a cooking room, and suctions fumes generated during cooking (such as from pot 1) together with air and discharges the suctioned fumes and air to the outside.

Referring to FIGS. 1 and 2, the range hood 100 includes a hood body 2, a fan 3 generating an air flow inside the body 2, a disk filter 4 provided in a flow path 20 of the air flow, a motor 5 rotating the disk filter 4, and a rectifying plate 6 provided upstream of the disk filter 4 in the flow path 20 of the air flow.

Hereinafter, each component will be described.

The hood body 2 is provided, for example, above a cooking appliance 1, and includes a suction port 21 that suctions steam or fumes together with air, and an exhaust port 22 that discharges the suctioned air and the like to the outside. The suction port 21 is formed on a lower surface of the hood body 2 and opened downward, for example, forming a substantially rectangular shape. In addition, the exhaust port 22 may be formed on an upper surface or a rear surface of the hood body 2. For example, the exhaust port 22 may be connected to an exhaust duct (not shown).

The fan 3 is provided inside the hood body 2 and generates a flow of air from the suction port 21 to the exhaust port 22 inside the hood body 2. Although the fan 3 according to the embodiment employs a sirocco fan, the type of the fan 3 is not limited thereto, and other types of fans, such as a propeller fan may be used.

The disk filter 4 is provided inside the hood body 2 and forms a substantially circular shape. The disk filter 4 is configured to cover an opening 201a having a substantially circular shape and formed in an inner panel 201 (a bottom panel of a recessed portion forming the suction port 21) which forms the suction port 21 of the hood body 2. Here, the disk filter 4 is provided to be inclined downward as being directed along the X axis. For example, the disk filter 4 may be inclined in the −Y direction as being directed along the X axis. The disk filter 4 is rotated at a predetermined rotation speed (e.g., 700 rpm) by the motor 5 inside the hood body 2.

Figure 3:
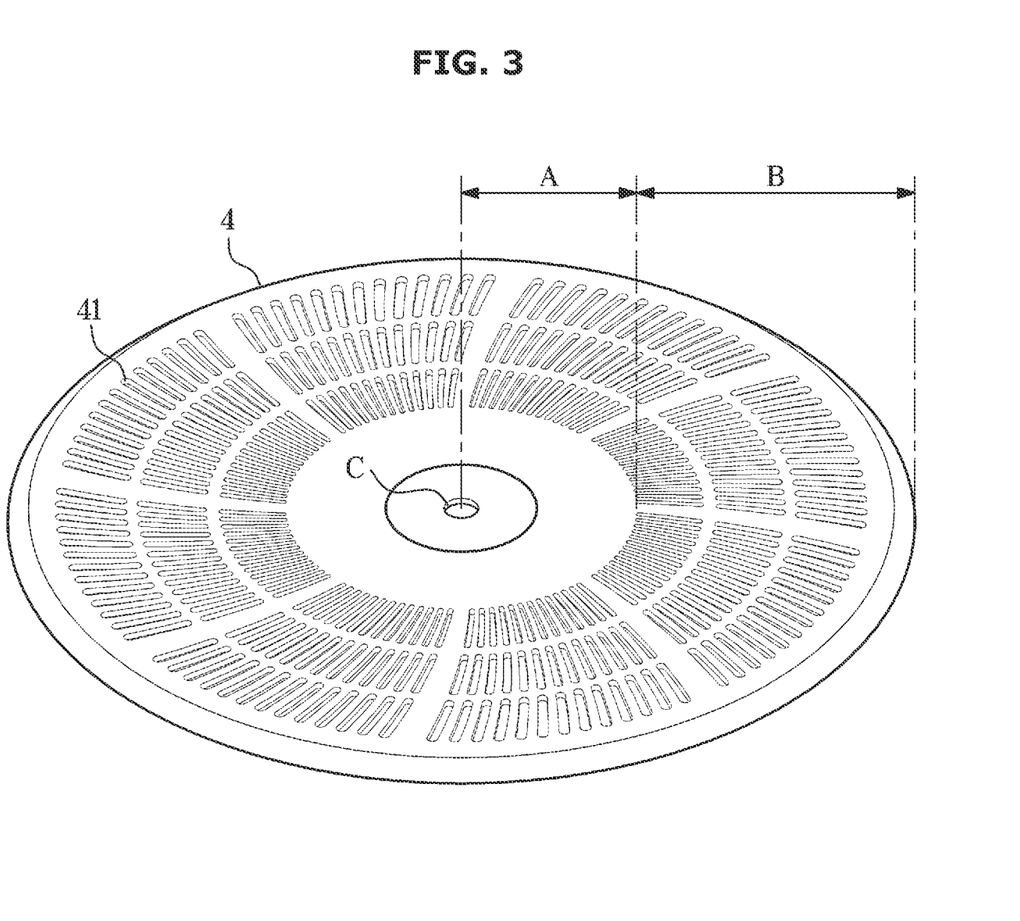
FIG. 3 is a perspective view schematically illustrating a disk filter according to an embodiment of the disclosure.

FIG. 3 is a perspective view schematically illustrating a disk filter according to an embodiment of the disclosure.

Referring to FIG. 3, the disk filter 4 is provided with a plurality of slits 41 through which the flow of air passes. Specifically, the plurality of slits 41 are radially provided with respect to a rotation center C of the disk filter 4. Here, each slit 41 has a shape that is curved in a direction opposite to the rotation direction of the disk filter 4 as being directed toward the radial outer side.

Further, in the disk filter 4, the slit 41 is not formed in an area A within a radial distance of less than 35% in the radial direction from the rotation center C, and the slits 41 are only formed in an area B corresponding to or outside a radial distance of 35% in the radial direction from the ration center C. However, the sizes of the areas A and B are not limited to 35%.

The rectifying plate 6 may be provided at the suction port 21 of the hood body 2 as shown in FIG. 1. The rectifying plate 6 forms a gap with the front panel 201 forming the suction port 21 to increase the suction power. Since the rectifying plate 6 is located below the disk filter 4, the disk filter 4 may be covered. Moreover, the rectifying plate 6 is rotatably connected with respect to the hood body 2, and is configured to be opened and closed with respect to the hood body 2. For example, the rectifying plate 6 may be rotatably coupled to the hood body 2 at one end along the Y direction. Here, a state in which the rectifying plate 6 is opened refers to a state in which the rectifying plate 6 is rotated in the −Y direction centering on one end of the rectifying plate 6 (refer to FIG. 2).

In addition, the range hood 100 according to the embodiment is configured to collect oil separated by the disk filter 4 from the rectifying plate 6 located in the −Y direction from the disk filter 4 (e.g., below the disk filter 4).

Figure 4:
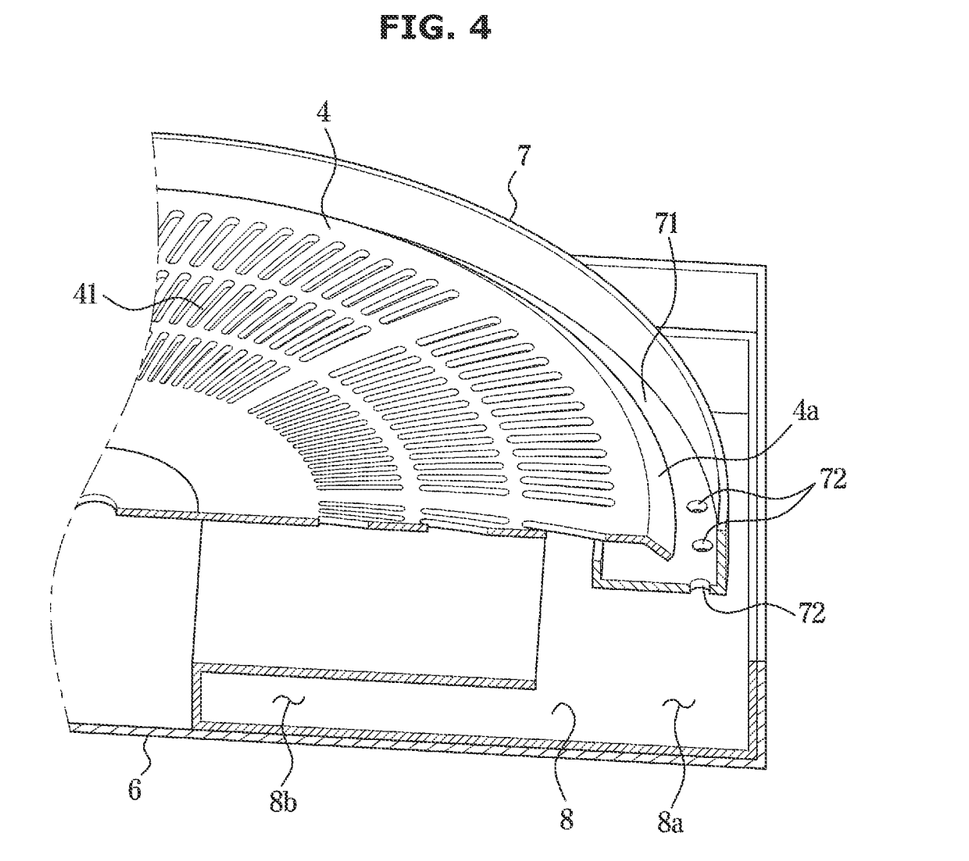
FIG. 4 is a diagram illustrating a detailed configuration of a disk cover according to an embodiment of the disclosure.

Specifically, as shown in FIGS. 1 and 4, the range hood 100 further includes a disk cover 7 configured to surround an outer periphery portion 4a of the disk filter 4 to guide oil from the disk filter 4 to be transferred to a predetermined portion of the rectifying plate 6 to be drained.

The disk cover 7 is configured to surround the entire circumference of the outer periphery portion 4a of the disk filter 4, and has a substantially ring shape. For example, the disk cover 7 may include an annular shape. Specifically, the disk cover 7 has a ring-shaped groove 71 corresponding to the outer periphery portion 4a of the disk filter 4. In the embodiment, the front panel 201 of the hood body 2 is formed with an opening 201a. The opening 201a may cover the outer periphery portion 4a of the disk filter 4 in the X axis and Y axis directions. For example, the portion opening 201a has a shape that covers the upper surface and the side surface of the outer periphery portion 4a of the disk filter 4. In addition, the disk cover 7 may cover the outer periphery portion 4a of the disk filter 4 in the X axis and −Y axis directions so as to cover the outer periphery portion 4a of the disk filter 4 together with the opening 201a. For example, the opening 201a has a shape that covers the lower surface and the side surface of the outer periphery portion 4a. Further, the disk cover 7 is detachably fixed to the panel 201 forming the opening 201a.

FIG. 4 is a diagram illustrating a detailed configuration of a disk cover according to an embodiment of the disclosure.

Referring to FIG. 4, the disk cover 7 includes an outlet portion 72 configured to receive oil scattered by centrifugal force from the disk filter 4 while guiding the oil to be transferred to a predetermined portion of the rectifying plate 6 and drain. The outlet portion 72 includes one or a plurality of through holes formed through the bottom surface of the groove 71 of the disk cover 7. The outlet portion 72 may include an outlet hole 72. In the embodiment, the bottom surface of the groove 71 of the disk cover 7 may be formed to be inclined as being directed along the X direction. For example, the bottom surface of the groove 71 of the disk cover 7 is inclined with respect to the horizontal direction, and the outlet portion 72 is provided at a lower end of the bottom surface of the groove 71. Here, the disk cover 7 is provided to be inclined downward as being directed along the X axis to correspond to the disk filter 4. For example, the disk cover 7 may be inclined in the −Y direction as being directed along the X axis. Accordingly, oil received in the groove 71 of the disk cover 7 may easily move to the outlet portion 72 by its own weight.

Oil flows out to a predetermined portion of the rectifying plate 6 by the outlet portion 72 of the disk cover 7 described above. In the embodiment, as shown in FIG. 1 and other drawings, an oil collecting portion 8 for collecting oil flowing out from the outlet portion 72 is provided on one surface (e.g., an upper surface) of the rectifying plate 6. The oil collecting portion 8 is detachably provided on the rectifying plate 6 (refer to FIG. 2). In addition, the oil collecting portion 8 is configured to prevent collected oil 8d from leaking in a state in which the rectifying plate 6 is opened with respect to the hood body 2 (in a state in which one end of the rectifying plate 6 in the −Y direction end is opened). Specifically, in the oil collecting portion 8, an opening 8a may be located at one end along the Y axis direction of the rectifying plate 6, and a storage space 8b may be formed to extend from the opening 8a in the −Y direction. Here, the oil collecting portion 8 may be configured to be detachable in a state in which the rectifying plate 6 is not opened. In addition, the oil collecting portion 8 may be provided with an oil detecting portion 8c for detecting the amount of collected oil and configured to notify a user when a predetermined amount of oil is collected. The oil detecting portion 8c may be arranged inside the oil collecting portion 8.

Here, when the disk cover 7 is used, the disk cover 7 obstructs a fluid flow of fumes that does not pass through the disk filter 4 and but passes through the gap between the disk filter 4 and the opening 201a, so that the flow rate of fumes passing through the gap may be reduced. In addition, a fume collecting test based on BLT VU-08 "Oil Collection Efficiency Test of Filter" with an air volume of the fan 3 of 350 CMH and a rotation speed of the disk filter 4 shows a result in which a fume collection rate without using the disk cover 7 was 76%, and a fume collection rate using the disk cover 7 was 79%. That is, when the disk cover 7 is used, the fume collection rate is improved by 3%.

In addition, one surface (for example, the lower surface) of the rectifying plate 6 may be subjected to an oil-repellent treatment, such as oil-repellent coating. When the lower surface of the rectifying plate 6 is subjected to an oil repellent treatment, oil is less likely to stick to the lower surface of the rectifying plate 6, and thus the lower surface of the rectifying plate 6 is less likely to be contaminated. However, examples of the oil repellent treatment are not limited to the oil repellent coating. In addition, oil repellency treatment or hydrophilic treatment may be applied to the upper surface of the rectifying plate 6. Furthermore, oil repellency treatment or hydrophilic treatment may be applied to the disk filter 4, the disk cover 7, or the inner surface of the hood body 2 in which the flow of air is formed by the fan 3. In particular, when the disk filter 4 and the disk cover 7 are subjected to oil repellency treatment or hydrophilic treatment, oil may easily flow to the oil collecting portion 8 of the rectifying plate 6.

Effects of the Embodiment

According to the range hood 100 configured as described above, the disk cover 7 surrounding the outer periphery portion 4a of the disk filter 4 includes the outlet portion 72 configured to drain oil from the disk filter 4 to a predetermined portion of the rectifying plate 6, so that oil scattered by receiving a centrifugal force from the rotating disk filter 4 may be collected by the rectifying plate 6. As a result, the collected oil may be moved to the predetermined part before being oxidized by oxygen in the air and having an increased viscosity, and the disk cover 7, which is an oil flow path, is always cleaned by newly collected oil. That is, since the disk filter 4 does not come into contact with the accumulated oil, and the oil with an increased viscosity does not interfere with the rotation of the disk filter 4, the range hood 100 may be continuously used without cleaning for a long period of time, thereby the cleaning frequency may be reduced. In particular, in the disclosure, since oil is collected in the rectifying plate 6 that is easy to access by a user, the effort of the cleaning work is reduced while improving the workability.

In the improvement of workability, the effort regarding cleaning was quantified and compared. To quantify the effort required for cleaning, the calories were calculated based on details of a cleaning work, a Metabolic Equivalent of Task (MET) value thereof, and a working time according to the following equation, and was compared with a metal mesh filter according to the existing technology, and the related art (Patent Document 1) having a configuration for collecting oil in a reservoir of a grease collection member that surrounds the outer periphery of a disk filter.

Consumption calories calculated (kcal)=MET×work time (H)×body weight (kg)

(Calculated using the MET value shown in Table 2 with a body weight of 60 kg)

TABLE 1

Comparison of the effect of reducing effort for cleaning according to the disclosure

| | Effort per cleaning | | | Effort for cleaning (in ten years) | |
|---|---|---|---|---|---|
| | Consumption calories (kcal) | Compared to the existing technology | Cleaning cycle (year) | Total consumption calories (kcal) | Compared to the existing technology |
| disclosure | 51 | 31% (reduction rate 68%) | 2 | 257 | 8% (reduction rate 92%) |
| Related art | 63 | 38% (reduction rate 62%) | 0.5 | 1262 | 38% (reduction rate 62%) |
| Existing technology | 164 | 100% | 0.5 | 3282 | 100% |

Reference: Japan Ministry of Health, Labor and Welfare, 'Physical Activity Standards for Health 2013'

TABLE 2

MET values defined for cleaning tasks

| | Tasks according to cleaning | | | |
|---|---|---|---|---|
| MET Values | Existing technology (a metal mesh Filter) | Related Art (oil is collected from a portion surrounding an outer periphery of a disk) | disclosure (oil is collected on a rectifying plate) | Reference life activities (from patent documents) |
| 1.8 | Filter rinsing cleaning, drying | Detach a disk filter Dispose of collected oil Clean the disk filter and rectifying plate | Detach a disk filter and an oil collecting portion Dispose of collected oil Clean the disk filter and rectifying plate | Washing dishes |
| 3.0 | Remove a filter, Mount a filter, Prepare to clean, Arrange | Prepare to clean, Arrange | Prepare to clean, Arrange | Kitchen work assistant, Arrange |
| 3.3 | — | Wipe a main body Cleaning | Wipe a main body Cleaning | Cleaning |
| 3.5 | Wash a filter, Wipe a main body Cleaning, Clean a sink | Detach an oil collecting portion, and a rectifying plate | — | Bathroom cleaning, Carrying light loads |

MET is a value obtained by dividing an energy consumption of a given physical activity by the metabolic rate at rest in a sitting position (equivalent to about 3.5 mL/kg/min of oxygen intake).

In addition, the bottom surface of the disk cover 7 may be provided to be inclined downward as being directed along the X axis. For example, the bottom surface of the disk cover 7 may be inclined with respect to the horizontal direction. In addition, the outlet portion 72 is provided at the lower end portion of the bottom surface of the disk cover 7. Accordingly, oil moves to the outlet portion 72 of the disk cover 7 and easily flows out from the outlet portion 72 to the rectifying plate 6, so that the oil collection efficiency of the rectifying plate 6 may be improved.

Figure 5:
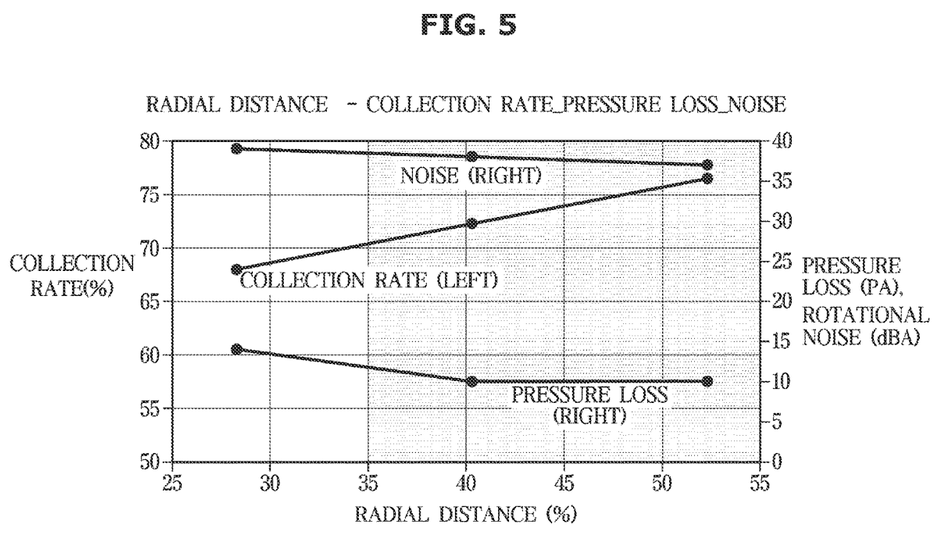
FIG. 5 is actual measurement data showing a slit formation area and the overall performance of a disk filter according to an embodiment of the disclosure.

FIG. 5 is actual measurement data showing a slit formation area and the overall performance of a disk filter according to an embodiment of the disclosure.

Referring to FIG. 5 results of a fume collection test according to BLT VU-08 "Oil Collection Efficiency Test of Filters" when an air volume of the fan 3 is set to 350 CMH and the rotation speed of the disk filter 4 is set to 700 rpm are shown. In the disk filter 4, since the slit 41 is not formed in the area A within a radial distance of less than 35% in the radial direction from the rotation center C, the rigidity of the disk filter 4 may be increased and noise during rotation may be reduced (refer to "noise" in FIG. 5). On the other hand, since the slit 41 is formed only in the area B of the disk filter 4 corresponding to or outside a radial distance of 35% in the radial direction from the rotation center C, the pressure loss during rotation may be reduced (refer to "pressure loss" in FIG. 5) while improving the oil collection rate (refer to "collection rate" in FIG. 5).

Other Modified Embodiments

Here, the disclosure is not limited to the above-described embodiment.

Figure 6:
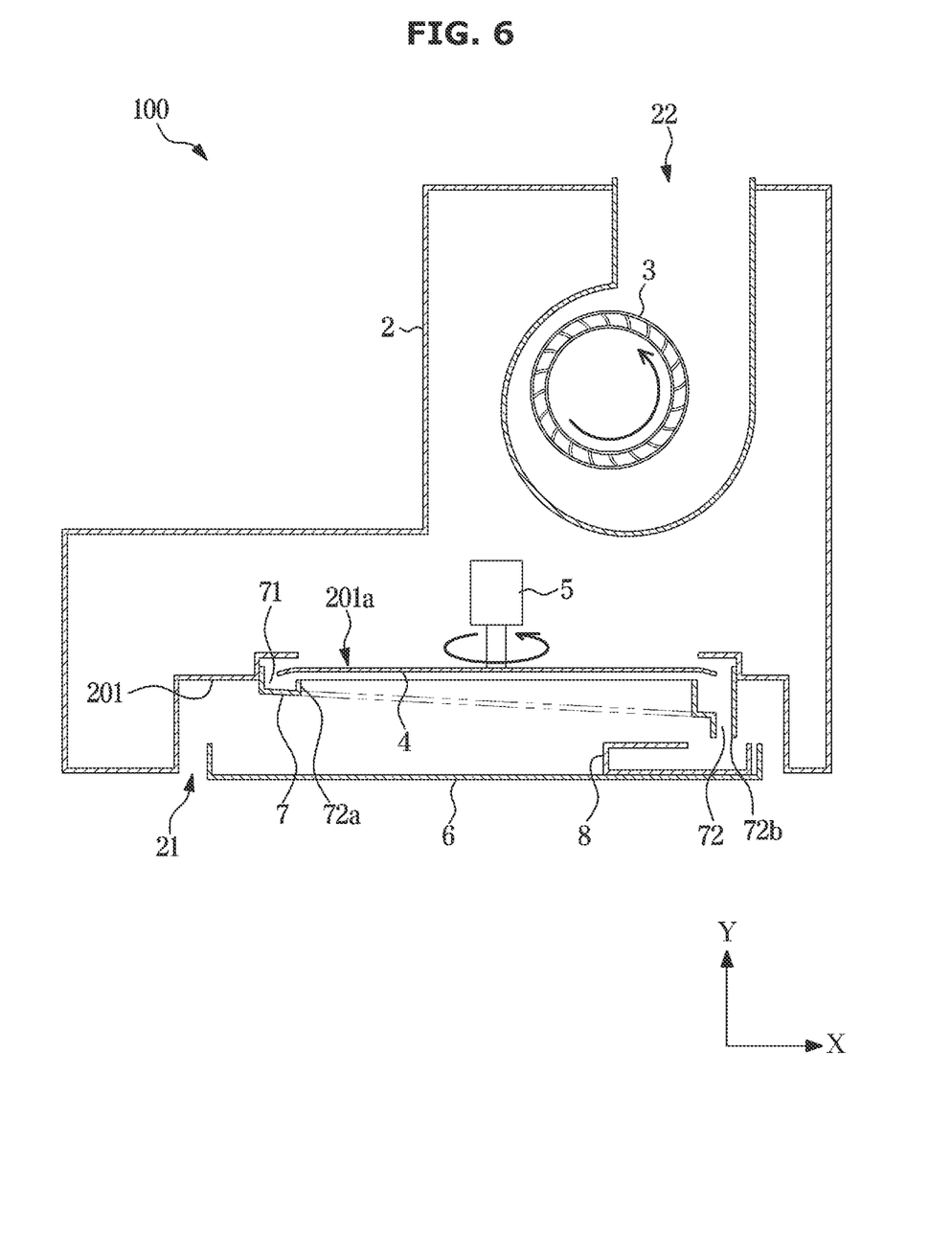
FIG. 6 is a cross-sectional view schematically illustrating a configuration of a range hood according to an embodiment of the disclosure.

FIG. 6 is a cross-sectional view schematically illustrating a configuration of a range hood according to an embodiment of the disclosure.

Referring to FIG. 6, although both the disk filter 4 and the disk cover 7 are provided to be inclined in the above embodiment, the disk filter 4 may be provided horizontally without being inclined, and the disk cover 7 may have a bottom surface that may be inclined with respect to the horizontal direction.

In addition, the outlet portion 72 in the above embodiment is provided as a through hole formed in the bottom surface of the disk cover 7, but according to another embodiment of the disclosure, the outlet portion 72 may be provided by forming an introduction path for guiding oil from the disk cover 7 to the rectifying plate 6. In this case, one end 72a of the introduction path is opened at the bottom surface of the disk cover 7, and the other end 72b of the introduction path may be a component connected to the oil collecting portion 8. With such a configuration, oil may be reliably guided from the disk cover 7 to the oil collecting portion 8 irrespective of the position of the oil collecting portion 8. The introduction path may form an outlet path 72.

Further, in the disk filter 4, the slit 41 may not be formed in an area within a radial distance of less than 50% in the radial direction from the rotation center C, and the plurality of slits 41 are formed in an area corresponding to or outside a radial distance of 50% in the radial direction from the rotation center C. With such a configuration, noise during rotation of the disk filter 4 may be further reduced, and the oil collection rate may be further improved.

Figure 7:
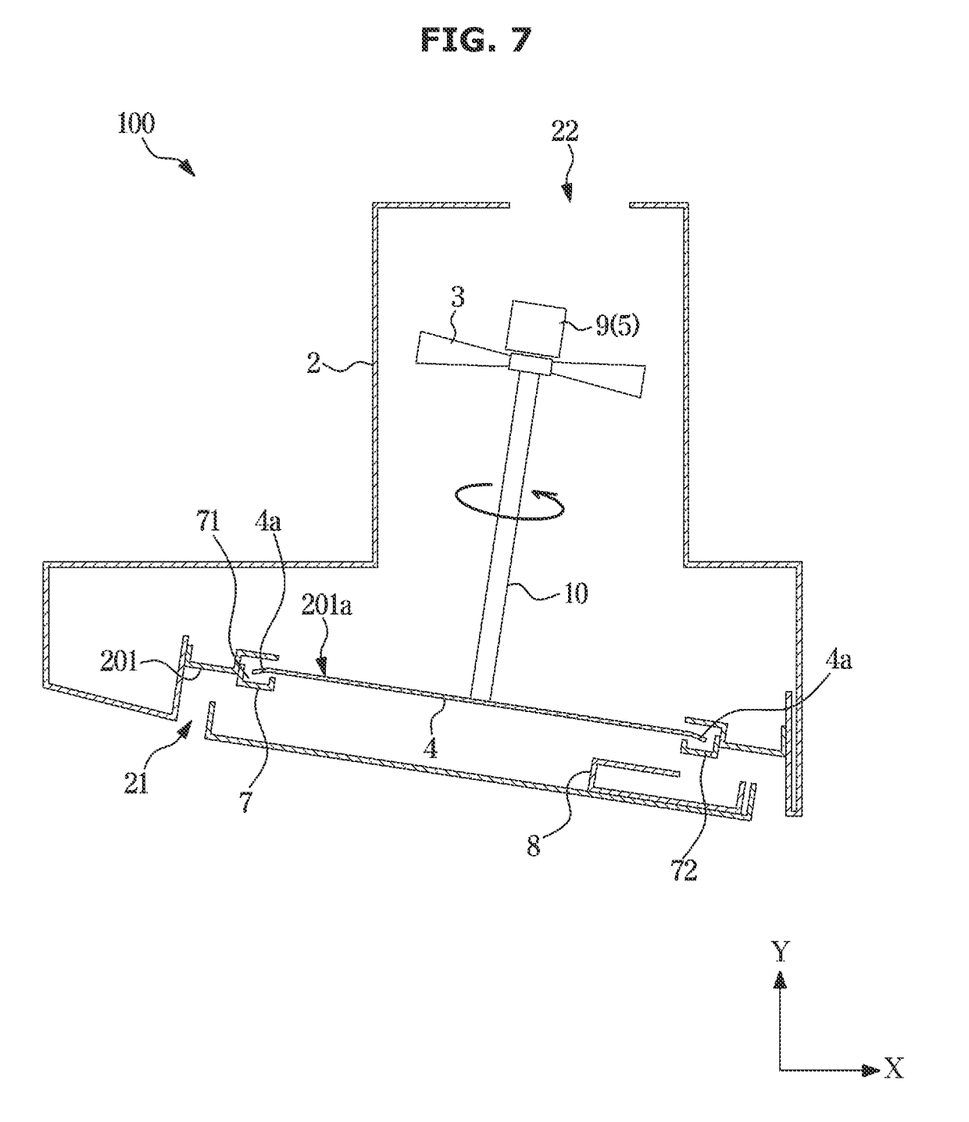
FIG. 7 is a cross-sectional view schematically illustrating a configuration of a range hood according to an embodiment of the disclosure.

FIG. 7 is a cross-sectional view schematically illustrating a configuration of a range hood according to still an embodiment of the disclosure.

Referring to FIG. 7, when the fan 3 is provided using a propeller fan, the range hood may include a motor 9 which rotates the propeller fan and a motor 5 which rotates the disk filter 4. In this case, the propeller fan 3 may be connected to the disk filter 4 through a connecting shaft 10. The motor 9 may be a fan motor 9.

As is apparent from the above, according to an aspect of the disclosure, a range hood with improved cleaning properties can be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A range hood comprising:
   a flow path;
   a fan disposed in the flow path to generate a flow of air that flows in the flow path;
   a disk filter disposed upstream of the fan in the flow path and configured to filter the air;
   a motor connected to the disk filter and configured to rotate the disk filter;
   a rectifying plate disposed upstream of the disk filter in the flow path; and
   a cover configured to cover an outer periphery of the disk filter, the cover including an outlet portion for oil to flow from the disk filter to the rectifying plate; and
   a collection case disposed on the rectifying plate, detachably provided on the rectifying plate and configured to collect oil flowing from the outlet portion, wherein the collection case includes:
     an opening formed below the outlet portion to correspond to the outlet portion and configured to open a part of a surface of the collection case; and
     a storage space formed in the collection case to extend toward a center of the rectifying plate so that the oil introduced from the opening is stored therein.

2. The range hood of claim 1, wherein the outlet portion includes:
   an outlet hole formed through a bottom surface of the cover.

3. The range hood of claim 2,
   wherein the fan, the disk filter, the collection case, and the rectifying plate are sequentially arranged in a direction from an upper side to a lower side, and
   wherein the outer periphery of the disk filter is formed to be inclined downward such that the oil flows to a bottom surface of the cover.

4. The range hood of claim 3,
   wherein the outlet hole is formed at an outer periphery of the bottom surface of the cover.

5. The range hood of claim 4, wherein the collection case further includes an oil detecting portion configured to detect an amount of oil accommodated in the storage space.

6. The range hood of claim 1, wherein the disk filter is inclined along one direction such that oil filtered out of the air flows to the cover.

7. The range hood of claim 6, wherein the cover and the rectifying plate are inclined along the one direction to correspond to the disk filter.

8. The range hood of claim 1, wherein a lower surface of the rectifying plate is subjected to oil repellency coating.

9. The range hood of claim 1, wherein the range hood further comprises:
   a body forming the flow path,
   wherein at least one of the disk filter, the cover, or the body is subjected to oil repellency treatment or hydrophilic treatment.

10. The range hood of claim 1,
    wherein the disk filter is devoid of a slit in a central portion of the disk filter to increase a rigidity of the disk filter, and
    wherein the disk filter is formed with a slit in an outer periphery portion of the central portion to allow the air to pass through the slit.

11. The range hood of claim 10, wherein the central portion of the disk filter is an area within a radial distance of less than 35% from a rotation center of the disk filter.

12. The range hood of claim 2, wherein the collection case is separably coupled to the rectifying plate.

13. The range hood of claim 2,
    wherein the disk filter and the rectifying plate horizontally extend in a front-rear direction, and
    wherein the bottom surface of the cover is inclined downward as being directed rearward such that the oil flows into the collection case.

14. The range hood of claim 13, wherein the outlet portion includes an outlet flow path inclined downward such that oil flows from the cover to the rectifying plate.

15. The range hood of claim 1, wherein the fan includes:
    a propeller fan, and the range hood further includes a fan motor configured to rotate the propeller fan, and
    a connecting shaft that connects the fan motor to the propeller fan to transmit a driving force from the fan motor to the propeller fan.

* * * * *